United States Patent [19]
Knauf, Jr. et al.

[11] Patent Number: 5,510,031
[45] Date of Patent: Apr. 23, 1996

[54] FAUCET ASSEMBLY WITH REPLACEABLE FILTER

[75] Inventors: Edmund R. Knauf, Jr., Sheboygan; Robert G. Schumacher, II, Sheboygan Falls, both of Wis.

[73] Assignee: AmeTek, Inc., Sheboygan, Wis.

[21] Appl. No.: 305,485

[22] Filed: Sep. 13, 1994

[51] Int. Cl.$^6$ .................... B01D 27/08; B01D 27/10
[52] U.S. Cl. .................... 210/460; 4/631; 4/652; 4/696
[58] Field of Search .................... 210/130, 133, 210/435, 451, 453, 455, 456, 459, 460, 473; 4/631, 632, 652, 696, DIG. 19

[56] References Cited

U.S. PATENT DOCUMENTS

| | | | |
|---|---|---|---|
| 3,184,064 | 5/1965 | Sampson et al. | |
| 3,780,869 | 12/1973 | Krongos | 210/460 |
| 4,206,055 | 6/1980 | Hauk et al. | 210/456 |
| 4,686,037 | 8/1987 | Lang | 210/460 |
| 5,061,367 | 10/1991 | Hatch et al. | |
| 5,082,568 | 1/1992 | Holler | |
| 5,126,041 | 6/1992 | Weber et al. | |
| 5,279,329 | 1/1994 | Pippel | 210/433.1 |

*Primary Examiner*—W. L. Walker
*Attorney, Agent, or Firm*—Andrus, Sceales, Starke & Sawall

[57] ABSTRACT

A water faucet apparatus for use with a sink or countertop faucet assembly includes a replaceable filter cartridge which is mounted in a cartridge housing formed as an integral part of the main body of the faucet assembly and positioned directly below the faucet spout below the level of the sink or countertop. The base to which the faucet spout is attached is easily removable to access the filter element inside the housing for replacement.

9 Claims, 2 Drawing Sheets

FAUCET ASSEMBLY WITH REPLACEABLE FILTER

BACKGROUND OF THE INVENTION

The present invention pertains to a water faucet assembly and, more particularly, to a replaceable filter apparatus for use with a conventional faucet of the type which is typically mounted on a sink or a similar countertop mounting surface.

Filters for water delivered by faucets for drinking, cooking, and other household uses are well known in the art. Such filters may comprise whole house units which are plumbed into a main water supply line to the building and are operative to filter the entire incoming flow of water, and may include replaceable filter elements. Another type of filter unit is mounted beneath a sink or the adjacent countertop, is plumbed into one of the water supply lines (typically cold water), and may include a replaceable filter element requiring access to the mounting space from below. Countertop units are also well known in the art. Such units include separate apparatus which is connected to the faucet outlet and a freestanding filter housing which is placed on an adjacent countertop or the like. Another countertop mounted unit includes a filter housing which is plumbed directly into the water supply system upstream of the faucet and is mounted on the sink or adjacent countertop in proximity to the faucet. Such countertop-mounted units typically include a manual diverter valve which directs the flow of water in the supply line through the filter, and a separate faucet for delivering the filtered water. Such units are shown, for example, in U.S. Pat. Nos. 3,184,064 and 5,126,041. These units also typically include replaceable filter elements.

Such countertop units which are plumbed into and permanently affixed to the sink or countertop are not only unsightly, but are also obstructive to full and free use of the surrounding space. There is, therefore, a real need for a replaceable filter apparatus which provides the benefits of prior art devices having readily replaceable filter elements, yet is unobtrusive and does not detract from the esthetics or utility of the sink and surrounding countertop areas.

SUMMARY OF THE INVENTION

In accordance with the present invention, a conventional water faucet of the type mounted on a sink or similar countertop mounting surface includes a filter element which is accessible for replacement from above the mounting surface, but is mounted below the sink or similar mounting surface. The apparatus includes a filter housing which is attached to depend downwardly from the underside of the mounting surface below the faucet. The housing defines with the mounting surface a filter element opening. A faucet base which includes a housing end cap demountably attaches the faucet to the filter element opening. A replaceable filter element is insertable into the open filter housing, and means for connecting the water supply to the filter housing operates to cause the water to pass through the filter element before discharge through the faucet.

The filter element also includes valve means for controlling the supply of water to the filter housing and the faucet in a typical application, where the faucet is supplied by two independent water supplies, the connecting means includes valve means for each water supply to independently control the flows thereof. In one embodiment, the connecting means for one of the water supplies includes a filter by-pass passage which connects that water supply directly to the faucet. In the preferred embodiment, the connecting means for each of the water supplies includes a filter by-pass passage connecting the respective water supply directly to the faucet, and one of said by-pass passages includes a flow diverter which is operable to selectively direct the flow of water into the filter housing and through the filter element. Typically, the two water supplies comprise separate hot and cold water supplies and the hot water filter by-pass passage does not include a diverter to direct flow through the filter element.

In accordance with the presently preferred construction of the invention, for a faucet operatively connected to separate supplies of hot and cold water, the filter apparatus includes a unitary body which is adapted to be attached to the sink or similar mounting surface, which body has hot and cold water inlet connections, a central open-ended filter housing, and an open-ended water outlet chamber surrounding the open end of the filter housing. A faucet base which includes an end cap is adapted to demountably attach the faucet to the outlet chamber opening. A replaceable filter element is insertable into the filter housing through the open end. A filter element retainer is positioned between the end cap and the filter element, and includes means for sealing the interfaces between the filter housing and the outlet chamber and between the outlet chamber and the end cap. The apparatus includes valve means for independently controlling the supplies of water to the faucet, cold water flow means for directing water from the cold water inlet connection into the filter housing, through the filter element and into the outlet chamber for discharge through the faucet; and hot water flow means for directing water from the hot water inlet connection directly into the outlet chamber for discharge through the faucet. A check valve is included to prevent a backflow of water from the outlet chamber into the filter chamber. The presently preferred embodiment also includes a flow diverter in the cold water flow means which is operable to selectively direct the flow of cold water from the cold water inlet connection directly into the outlet chamber for discharge through the faucet. In the preferred embodiment, the check valve is mounted on the filter element retainer.

DETAILED DESCRIPTION OF THE PREFERRED EMBODIMENTS

Figure 1:
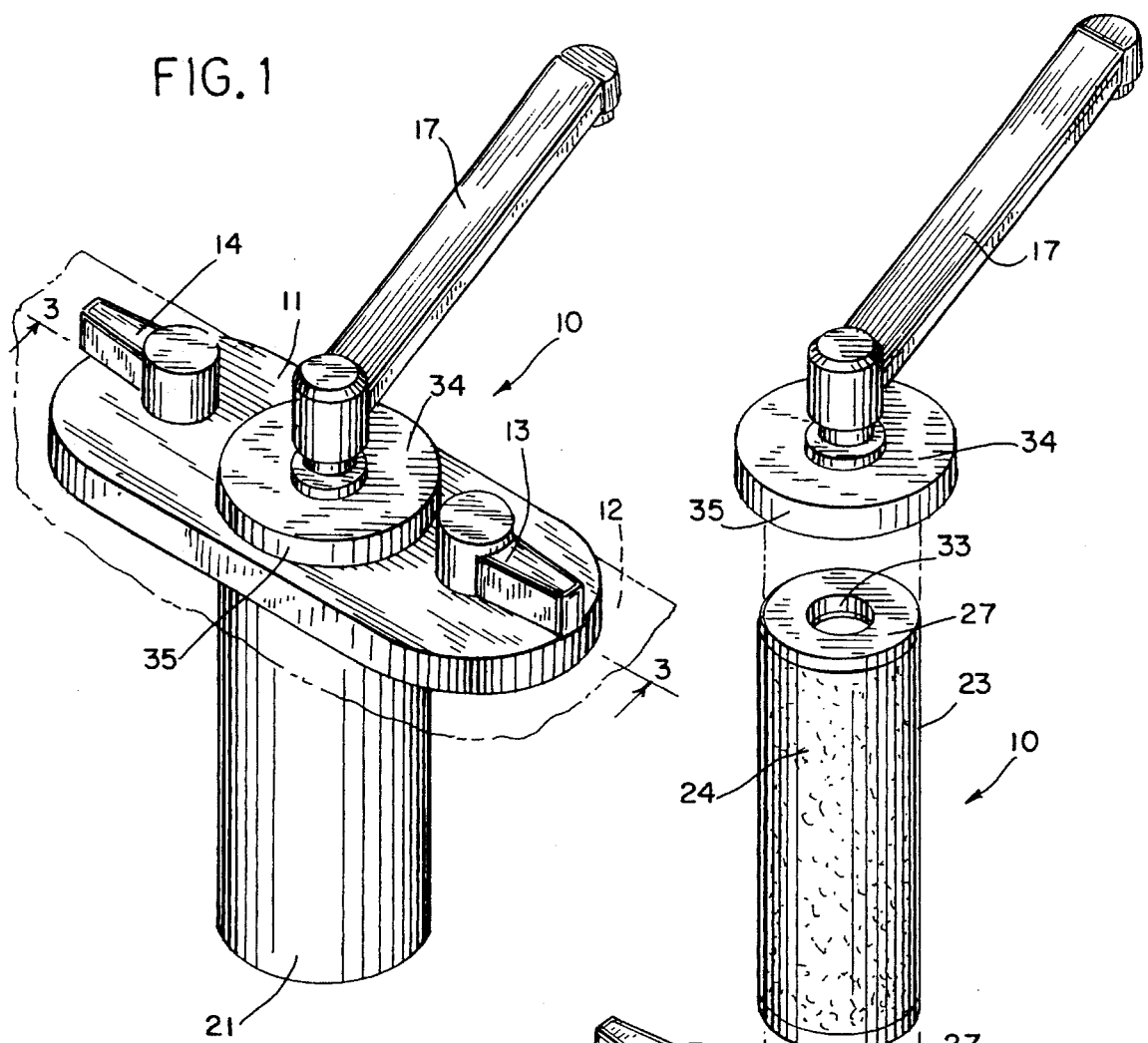
FIG. 1 is a perspective view of one embodiment of the replaceable faucet assembly of the present invention.
Figure 2:
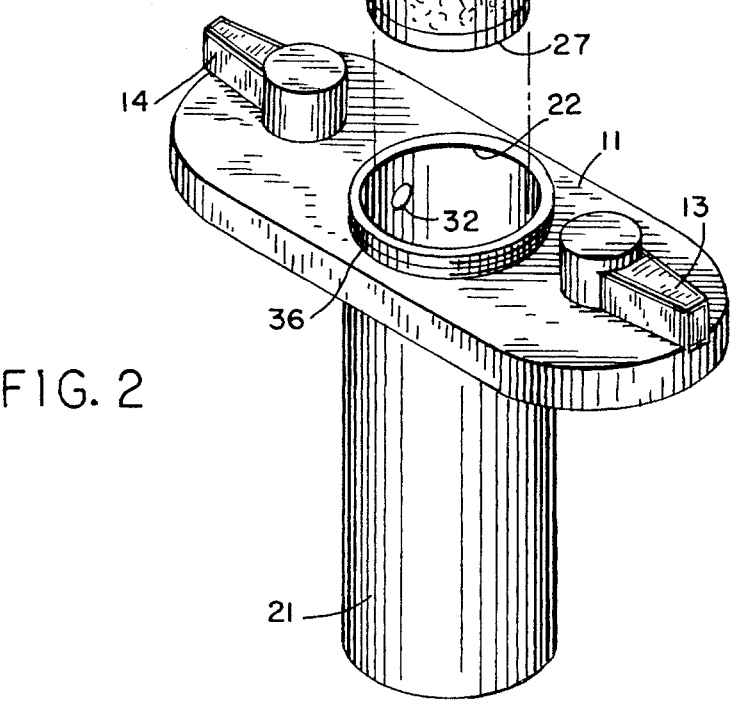
FIG. 2 is an exploded perspective view of the apparatus shown in FIG. 1.
Figure 3:
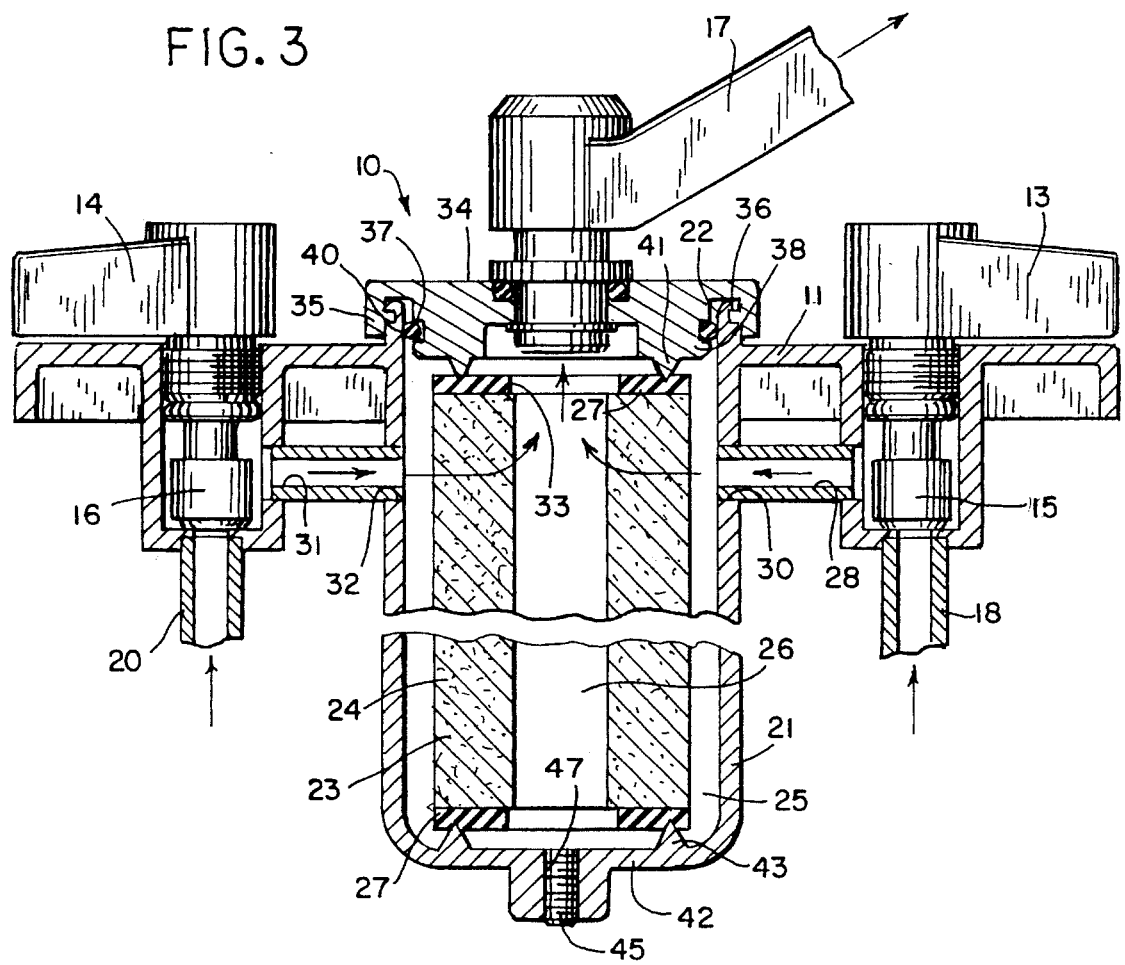
FIG. 3 is a vertical section taken on line 3—3 of FIG. 1.

Referring first to FIGS. 1–3, a faucet assembly 10 includes a main body 11 which is attached to a horizontal mounting surface 12, which mounting surface may comprise part of a sink or an adjacent countertop. In accordance with conventional construction, the faucet assembly 10 includes rotatable hot and cold water handles 13 and 14 for operating the respective hot and cold water valves 15 and 16, and a centrally mounted faucet spout 17 which may be fixed or, in the embodiment shown, pivotable about a vertical axis. Water is supplied to the faucet assembly in a conventional manner via hot and cold water inlet lines 18 and 20, respectively.

The main body 11 of the faucet assembly includes an integral downwardly depending cylindrical filter housing 21, centrally mounted below the faucet spout 17 and having an open upper end 22 adapted to removably receive a replaceable filter element 23. The filter element 23 includes a cylindrical filter medium 24 or other water treatment mechanism which defines, with the filter housing 21, an annular inlet chamber 25, and has a hollow interior 26 for the filtered water. The opposite ends of the filter element 23 are provided with flexible annular sealing rings 27.

The flow of hot water from the hot water inlet line 18 to the faucet 17 is controlled by operation of the hot water valve 15, the opening of which allows hot water to flow through a hot water transfer passage 28 into the filter housing 21 via a hot water opening 30. Similarly, the flow of cold water from the inlet line 20, controlled by operation of the cold water valve 16, passes via a cold water transfer passage 31 into the filter housing 21 via a cold water opening 32. Water flowing into the housing from either transfer passage 28 or 31 is distributed within the annular inlet chamber 25, passes under pressure through the filter media 24 into the hollow interior 26, and upwardly through the center opening 33 in the upper sealing ring 27 and into the faucet spout 17 for discharge.

In accordance with an important feature of the subject invention, the faucet spout 17 is attached to a faucet base 34 which is demountably attachable to the open end 22 of the filter housing 21 to provide an end cap or closure for the housing. More specifically, the faucet base 34 includes a flanged edge 35 provided on its interior face with a quarter turn thread adapted to cooperate with a similar quarter turn thread on the outside of the annular upper edge 36 defining the open end 22 of the filter housing. The faucet base 34 also includes an annular interior boss 38 having a sealing ring groove 37 in the outer face which is adapted to hold an O-ring 40 in sealing engagement with the inside surface of the cylindrical housing 21. The annular boss 38 also includes an integral V-bead sealing ring 41 which is adapted to engage and seal against the upper sealing ring 27 when the faucet base 34 is threadably secured to the annular upper edge 36 of the housing. Similarly, the bottom wall 42 of the filter housing 21 includes an integral V-bead sealing ring 43 which is adapted to engage and seal against the lower sealing ring 27 when the base 34 is secured to the filter housing. As shown in FIG. 3, periodic draining of sediment or the like from the housing 21 may be effected by a removable drain plug 45 centered in the bottom wall and closing a drain hole 47. The bottom wall 42 of the filter housing 21 may include an integral upstanding center post (not shown) adapted to receive the center opening 33 in the lower sealing ring 27 to help center the filter element 23 when it is inserted into the housing. Alternately, external guide ribs formed on the inside wall of the housing 21 and extending radially inwardly may be used to center the element.

Figure 4:
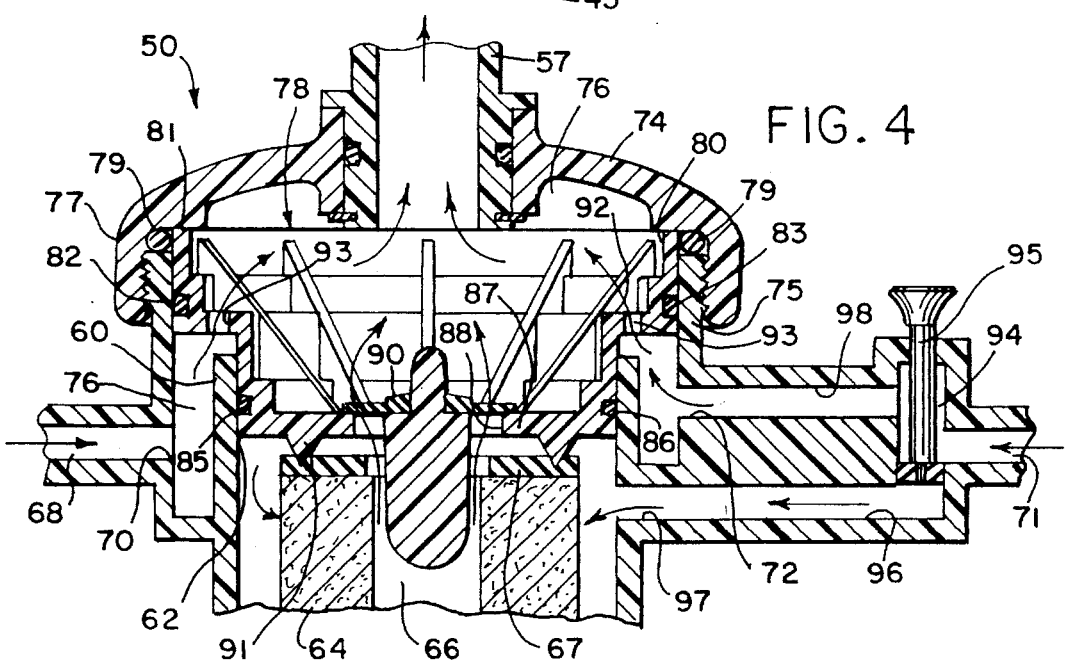
FIG. 4 is a partial vertical section, similar to FIG. 3, showing the presently preferred construction of the apparatus of the present invention.

The sectional view of FIG. 4, which is similar to the FIG. 3 view, shows a presently preferred embodiment of the invention. The faucet assembly 50 includes a main body 51 to the opposite ends of which are mounted hot and cold water valves operated by respective handles (not shown) in a manner similar to the embodiment of FIGS. 1–3. Under the control of the valves, water is delivered to a centrally mounted faucet spout 57 via a hot water transfer passage 68 and a cold water transfer passage 71. The main body 51 also includes an integral downwardly depending cylindrical filter housing 61 having an open end defined by a cylindrical edge 60. The filter housing 61 is deep enough to receive a filter element 63 which includes a cylindrical filter media 64 and opposite annular sealing rings 67.

The faucet spout 57 is attached to a faucet base 74 for demountable attachment to the main body 51. The faucet base 74 in this embodiment, however, is not demountably attached directly to the upper open end of the filter housing, but rather is attached to an upwardly opening annular flange 75 which surrounds the upper end 62 of the filter housing 61 and defines a water outlet chamber 76. The outlet chamber 76 is closed by threading the flanged edge 77 of the faucet base 74 onto the similarly threaded annular flange 75 extending upwardly from the main body, in a manner generally similar to attachment of the faucet base 34 of the previously described embodiment. Thus, the faucet base 74 provides a demountable closing end cap for the outlet chamber opening.

A filter element retainer is positioned within the outlet chamber 76 and interposed between the faucet base 74 and the filter element 63. In addition to positioning and retaining the filter element in place, the element retainer 78 also seals the interfaces between the various elements, includes a check valve to prevent backflow, and distributes the flow of water into the outlet chamber for passage out of the faucet spout 57. The filter element retainer 78 includes an upper flange 80 having an annular upper edge 81 which is engaged by the underside of the faucet base 74. An upper O-ring seal 79 seals the interface between the flanged edge 77 of the faucet base, the upper flange 80 of the retainer and the upper edge of the annular flange 75. The flange 80 is sized to fit within the upwardly opening annular flange 75 of the main body and may include an annular groove 82 in its outer face to receive a supplemental O-ring seal 83. The filter element retainer 78 also includes a lower flange 84 provided with an annular groove 85 for receiving an O-ring seal 86 which bears against the inside face of the filter housing 61 when the retainer is inserted into the housing after insertion of the filter element 63. The lower edge of the lower flange 84 is provided with an integral annular lip 87 which defines a central flow passage 88 allowing filtered water from the hollow interior 66 of the filter element to pass into the outlet chamber 76. A check valve 90 is positioned within the flow passage 88 to prevent backflow of water from the outlet chamber into the filter housing 61. The check valve 90 is carried by the retainer 78, but could as well be attached to the upper end of the filter element. The lower face of the annular lip 87 includes a V-bead sealing ring 91 which engages and seals against the upper sealing ring 67 of the filter element to prevent short circuit flow of water past the filter element.

Certain types of filter elements are damaged by or are ineffective to treat hot water and, therefore, the faucet assembly 50 of this embodiment is constructed to cause hot water entering via the hot water transfer passage 68 to completely by-pass the filter housing 61 and filter element 63. Thus, hot water from the transfer passage 68 passes directly into the outlet chamber 76 via a hot water opening 70. The upper and lower flanges 80 and 84 of the filter element retainer 78 are connected by an integral shoulder 92 in which is formed a series of circumferentially spaced flow passages 93. Water entering the lower portion of the outlet chamber 76 from the hot water transfer passage 68, flows upwardly through the flow passages 93 in the filter element retainer, into the upper portion of the outlet chamber and into the faucet spout 57 for discharge.

The cold water transfer passage 71, on the other hand, terminates in a branched connection 94 from which cold water may be selectively directed through the filter element 63 or directly into the outlet chamber 76 without filtering by manual operation of a diverter valve 95. The diverter valve is positioned in the branched connection 94 to permit cold water to flow through a filter connection 96 and into the filter housing 61 via a filter opening 97. Alternately, with movement of the diverter valve 95 to a second position, the cold water may be diverted through a raw water connection 98 directly into the outlet chamber 76 via a cold water opening 72 in the wall thereof. Cold water entering the outlet chamber without filtering then passes upwardly through the flow passages 93 in the filter element retainer 78 and out through the faucet 57, in the same manner as the direct passage of hot water previously described.

The faucet assembly embodiment of FIG. 4 could as well include a diverter valve 95, with the accompanying branched connection 94, in the hot water transfer passage 68. In this manner, if a filter element suitable for treating hot water is utilized, both hot and cold water may be treated; and, on the other hand, hot water could be diverted directly to the faucet if the filter element being utilized is not suitable for the treatment of hot water. As shown, the filter element retainer 78 is formed of a single piece which is inserted into the outlet chamber 76 after insertion of the filter element, and is enclosed therein by attachment of the faucet base to its mating threaded connection, as previously described. However, the filter element retainer 78 could be integrally formed with the faucet base 74 as by joining the annular upper edge 81 of the upper flange 80 to the underside of the base 74. With such an integral construction, the upper O-ring seal 79 could be eliminated and O-ring seal 83 used to provide the necessary seal.

The filter elements 23 and 63 of the embodiments described herein may be of any of the many types in general use for the treatment of drinking water or water for other household purposes. Thus, the filter media 24 and 64 comprising the active treating agent in the respective filter elements may comprise activated carbon in granular or block form, ion exchange or deionizing resins, halogenated disinfecting resins such as those employing active iodine, and mechanical filter elements such as synthetic filament and string wound elements. Filter elements using combinations of different types of media, such as disclosed in U.S. Pat. Nos. 5,061,367 and 5,082,568, may also be utilized.

Various modes of carrying out the present invention are contemplated as being within the scope of the following claims particularly pointing out and distinctly claiming the subject matter which is regarded as the invention.

We claim:

1. A faucet assembly with a replaceable filter apparatus comprising:

a water faucet adapted to be mounted on a sink or a similar countertop mounting surface and receiving a supply of water;

a filter housing attached to depend downwardly from the underside of the mounting surface below the faucet, said housing defining a filter element opening;

a faucet base including a housing end cap demountably attaching the faucet to said filter element opening;

a replaceable filter element insertable into said filter housing; and, means for connecting the water supply to the filter housing to cause the water to pass through the filter element before discharge through the faucet.

2. The faucet assembly as set forth in claim 1 including valve means for controlling the supply of water to the filter housing and the faucet.

3. The faucet assembly as set forth in claim 1 comprising:

two independent water supplies; and, said connecting means including valve means for each water supply for independently controlling the flows thereof.

4. The faucet assembly as set forth in claim 3 wherein the connecting means for one of said water supplies includes a filter by-pass passage connecting said one water supply directly to the faucet.

5. The faucet assembly as set forth in claim 3 wherein the connecting means for each of said water supplies includes a filter by-pass passage connecting the water supply directly to the faucet, and one of said by-pass passages includes a flow diverter operable to selectively direct the flow of water into said filter housing and through said filter element.

6. The faucet assembly as set forth in claim 5 wherein said water supplies comprise separate hot and cold water supplies, and the filter by-pass passage for the hot water supply is fixed.

7. A faucet assembly with a replaceable filter apparatus for use with a water faucet of the type mounted on a sink or similar countertop mounting surface and operatively connected to separate supplies of hot water and cold water, said apparatus comprising:

a unitary body adapted for attachment to the mounting surface, said body having hot water and cold water inlet connections, a central open-ended filter housing, and an open-ended water outlet chamber surrounding the open end of the filter housing;

a faucet base including an end cap demountably attaching the faucet to the outlet chamber opening;

a replaceable filter element insertable into said filter housing through said open end;

a filter element retainer positioned between the end cap and the filter element and including means for sealing the interfaces between the filter housing and the outlet chamber and between the outlet chamber and the end cap;

valve means for independently controlling the supplies of water to the faucet;

cold water flow means for directing water from the cold water inlet connection into the filter housing to cause the cold water to pass through the filter element and into the outlet chamber for discharge through the faucet;

hot water flow means for directing water from the hot water inlet connection into the outlet chamber for discharge through the faucet; and, a check valve operative to prevent a back flow of water from the outlet chamber into the filter chamber.

8. The assembly as set forth in claim 7 wherein said cold water flow means includes a flow diverter operable to selectively direct the flow of cold water from the cold water inlet connection into the outlet chamber for discharge through the faucet.

9. The assembly as set forth in claim 7 wherein said check valve is mounted on the filter element retainer.

* * * * *